US006560566B1

United States Patent
Lysen

(10) Patent No.: US 6,560,566 B1
(45) Date of Patent: May 6, 2003

(54) SIGNAL ANALYSIS PROCESS

(75) Inventor: Heinrich Lysen, Garching (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 96 days.

(21) Appl. No.: 09/639,175

(22) Filed: Aug. 16, 2000

(30) Foreign Application Priority Data

Aug. 16, 1999 (DE) .......................................... 199 38 723

(51) Int. Cl.[7] .............................................. G06F 15/00
(52) U.S. Cl. ........................... 702/189; 702/33; 702/54; 702/56; 702/66; 702/70; 702/79
(58) Field of Search ............................... 702/33–36, 42, 702/56, 54, 66, 67, 69–74, 79, 119, 183, 189, 193, FOR 103–104, FOR 134, FOR 136, FOR 139, FOR 141, FOR 151, FOR 170; 73/861.355, 861, 356; 375/329, 330, 334, 283–285, 308, 303

(56) References Cited

U.S. PATENT DOCUMENTS

| | | | | |
|---|---|---|---|---|
| 3,731,526 A | * | 5/1973 | Games | 73/71.4 |
| 3,765,773 A | * | 10/1973 | Weiner | 356/364 |
| 4,143,937 A | * | 3/1979 | Yonezawa | 359/29 |
| 4,485,357 A | * | 11/1984 | Voorman | 332/145 |
| 4,580,277 A | * | 4/1986 | Angello et al. | 375/308 |
| 4,672,634 A | * | 6/1987 | Chung et al | 375/303 |
| 5,924,091 A | * | 7/1999 | Burkhard | 707/7 |

* cited by examiner

Primary Examiner—Marc S. Hoff
Assistant Examiner—Carol S Tsai
(74) Attorney, Agent, or Firm—Nixon Peabody LLP; David S. Safran

(57) ABSTRACT

A process for analyzing a signal which composed of a sequence of discrete amplitude values to which portions with different phase angle contribute. Here, a reshaped signal is formed in which the sequence of amplitude values is changed such that the amplitude values, or instead of them approximation values which have been brought near the amplitude values, follow one another in ascending or descending sequences according to their size.

10 Claims, 1 Drawing Sheet

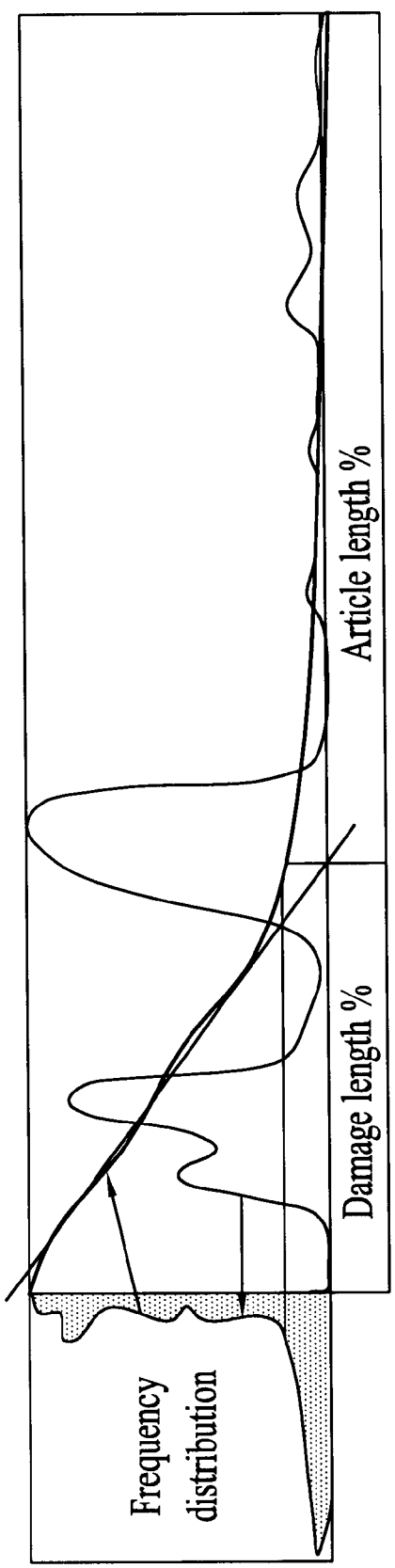

SIGNAL ANALYSIS PROCESS

BACKGROUND OF THE INVENTION

1. Field of the Invention

The invention relates to a process for analyzing a signal which is formed of a sequence of discrete amplitude values and to which portions with different phase angle contribute.

2. Description of Related Art

In the evaluation of the shape of signals to which portions with different phase angle contribute, it can be necessary to eliminate effects on the signal shape which are attributed solely to the phase shift of individual signal portions, i.e., the phase angle is to be eliminated from the signal shape. This is especially a problem when the relative phase angle of the signal portions is not known or not accurately known.

SUMMARY OF THE INVENTION

The primary object of this invention is to devise a signal analysis process which efficiently and easily eliminates effects attributed to phase differences of the signal portions from the signal shape.

This object is achieved in accordance with the invention by a process in which a reshaped signal is formed a sequence of discrete amplitude values to which portions with a different phase angle contribute, the sequence of amplitude values being changed such that the amplitude values or approximation values which have been brought near the amplitude values, follow one another in ascending or descending sequences according to their size.

It is advantageous in this approach for phase effects to be removed from the obtained reshaped signal which represents essentially an amplitude-sorted version of the original signal.

Sorting can be done in exact form, i.e., such that the amplitude value exactly preserved and only their sequence is changed. Generally however, it will be sufficient to carry out the sorting approximately, i.e., such that the amplitude values of the sorted signal do not correspond exactly, but only approximately to the original amplitude values; this can greatly reduce the computer cost. In doing so, the approximation values are preferably formed by assigning the same approximation value to all amplitude values which fall within a certain size class which covers a certain size range.

Preferably, sorting is performed by determining how many of each of the amplitude values fall into a certain one of the different size classes to which, according to the covered size range, a certain approximation value is assigned, and for each size class, beginning with the first free location, as many successive free locations of a field are described with the approximation value assigned to this size class as there are amplitude values which have fallen within this size class, the processing sequence of the size classes being determined according to the approximation values assigned to the respective size class in the ascending or descending direction.

Preferably, the signal is a processed signal for damage analysis on at least one cyclically moving machine element, especially of a roller bearing, which is caused by the movement of the machine element. The processed signal is preferably a signal portion with an adjustable period which has been separated from the originally received signal, the sorted signal being used for damage analysis. The period is preferably a period which is characteristic for damage of the machine element.

This process is especially suited, for example, for damage analysis from vibration signals of roller bearings, the signal extract being preferably the signal portions of the vibration signal which have been averaged over several periods and which have a periodicity which is characteristic for the damage.

These and further objects, features and advantages of the present invention will become apparent from the following description when taken in connection with the accompanying drawings which, for purposes of illustration only, show a single embodiment in accordance with the present invention.

BRIEF DESCRIPTION OF THE DRAWINGS

The sole FIGURE shows a signal segment before and after amplitude sorting in addition to the determined frequency distribution.

DETAILED DESCRIPTION OF THE INVENTION

The thin solid line represents a measurement signal which can be, for example, a portion of an acceleration signal in the time domain which has been received by means of an acceleration sensor on a rotating loaded roller bearing or a machine element which is vibration-coupled thereto, the portion shown representing only the signal portions which have a certain period duration, for example, the rollover period of damage in the outer annular running surface of the bearing. These signal portions can be separated by means of a corresponding filter from the overall signal, being averaged essentially over several periods. The signal portion obtained in this way is then a measure of the depth and length of the damage. But, phase differences which occur over the filter time interval or averaging time interval between or during the considered individual periods lead to "distortion" of the desired signal portion in the sense that the signal shape obtained from the consideration, i.e., addition, of several periods, deviates greatly from the signal shape during an individual period and makes damage analysis from the signal shape difficult.

This situation can be caused, for example, by slippage of the roller bodies over the part of the peripheral movement in which they are located outside the load area of the bearing. If, at this point, the signal attributed to a certain roller body is examined, the signal portions produced in the load range during rolling off of the roller body do not have any phase shift relative to one another; however, the signals produced during the next rotation, i.e., when the respective roller body has re-entered the load area, have an unknown phase shift with respect to the signals produced in the preceding pass, as a result of slip outside the load area, so that artifacts occur in the signal which has been averaged over several rotations of the roller body structure as a result of slippage of the roller body. This effect makes it difficult to evaluate the signal, especially with respect to the length of the damage rolled over by the roller body or the damage on the roller body itself.

However, these phase effects can be eliminated by transforming the obtained signal such that they are sorted ascending or descending according to amplitude, i.e., the signal is re-sorted with respect to the x-axis, here the time axis, for example, with all the way to the left being the largest amplitude and all the way to the right being the smallest amplitude of the original signal, as can be seen from the curve represented by the thick solid line in the FIGURE. In this sorting, generally, 100% maintenance of amplitude values is not necessary, so that conventional sorting processes are unnecessarily slow, especially when the x-axis is relatively finely divided.

In the evaluation of the preferred approximate sorting process, the signal is first processed into discrete values along the x-axis (here, the time axis) into n values (if the signal is not already discrete anyway with the desired grid), yielding a set of n numbers or amplitude values. Then, m different size classes are formed which, in succession, cover a certain amplitude size range, the number m being chosen according to the desired accuracy of sorting. The width b is preferably the same for all size classes and results from the difference of the maximum and minimum signal amplitudes, divided by the number of size classes, i.e., the y-axis is likewise divided into a discrete number values.

Then, the distribution of these amplitude values among the m different amplitude or size classes is determined, i.e., the amplitude axis is divided into m areas and it is determined how many of each of the n amplitude values fall into a certain range so that, in this way, the frequency distribution of the amplitude values is determined. In doing so, a certain size value is assigned to each size class which forms the approximation value for all of the amplitude values which fall within this class and can result, for example, from the average of the two class limits. The amplitude-sorted signal is then formed by describing the locations in a field with n locations in order, for each size class, beginning with the first free location in the field, as many successive free locations of the field are described with the approximation value assigned to this size class as there are amplitude values which have fallen within this size class, the processing sequence of the size classes being determined according to the approximation value assigned to the respective size class in the ascending or descending direction.

In this example, the highest value size class, i.e., with the largest amplitude values, is used first, the first approximation value being written in the location with number 1 on the left edge of the field. The result is then the distribution which is represented with the thick line and in which the largest amplitudes are located on the left edge and the smallest amplitudes are located on the right edge.

Then, in this example, the relative damage length can be determined from this amplitude-sorted distribution, i.e., from the reshaped signal, preferably by adapting a compensation function, for example, the residual sum of squares method, to the amplitude-sorted distribution. The compensation function can be chosen such that it contains four parameters which reproduce the damage depth, the damage length, the noise amplitude of the signal and the form of the damage, the damage length which has been determined in this way being indicated in the FIGURE.

Of course, in the example, the signal amplitudes could fundamentally also be sorted by means of a known sorting process, i.e., with complete fidelity to amplitude. However, the computer cost for this would be several times higher than in the described process for approximate sorting.

In conventional processes for exact sorting of a set of numbers by size into a field with n locations, for example, in a descending sequence, the process takes place such that the set of numbers is searched n times, during the first pass the largest number, in the second pass the second-largest number, etc. is determined and the numbers found in this way, beginning with the first location of the field, are sorted according to descending size in succession onto the still free location of the field which is the next at the time, i.e., then, largest number is at the first location of the field, the second largest number is at the second, etc. The shortcoming of this process is the high computer cost and the associated low speed for a large value of n. This also applies to the case in which exact sorting is not necessary at all. In the described process for approximate sorting, on the other hand, it is advantageous that the set of n numbers must be traversed only once, specifically when forming the frequency distribution, i.e., "filling" of the size classes, and furthermore, that when describing the field, the determined frequency distribution, i.e., the size classes, need likewise be traversed only once. In this way, the approximate process is much faster than the conventional exact process. In the approximate process, the sorting accuracy is reduced such that, instead of the original numbers or amplitude values, the size values or approximate values of the size classes are written into the field, i.e., the sorted amplitude values do not exactly correspond to the original amplitude values, so that the "size resolution" is limited by the width b of the size classes and is inversely proportional thereto. However, this loss of resolution can by kept as small as necessary by reducing the width b of the size classes, i.e., by using a large number of size classes.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Process for analyzing a discrete signal which is indicative of a characteristic of a moving machine element, in which the signal is composed of a sequence of discrete measured amplitude values and wherein the signal includes discrete amplitude values having different phase angles, comprising the steps of:

providing the discrete measured signal from a moving machine element, determining a number a defined size classes wherein each size class is indicative of a portion of the range of the amplitude values of the discrete signal, determining the number of discrete measured amplitude values of the discrete signal which fall into each size class, determining for each defined size class an approximation value from the number of discrete measured amplitude values in each defined size class, replacing each discrete measured amplitude value in each defined size class with the determined approximation value for each defined size class, and forming a reshaped signal by arranging in ascending or descending order the sequence of approximation values, wherein the reshaped signal is representative of the characteristic of the moving machine element.

2. Process as claimed in claim 1, wherein each size class has a width determined by finding the difference value between the smallest and the largest discrete measured amplitude value of the discrete signal and dividing the difference value by the number of size classes.

3. Process as claimed in claim 1, further comprising the step of subjecting the reshaped signal to curve matching.

4. Process as claimed in claim 2, comprising the step of subjecting the reshaped signal to compensation calculation.

5. Process as claimed in claim 1, wherein the discrete measured signal that is reshaped is a signal which has been processed for damage analysis of at least one cyclically moving machine element wherein the damage is caused by movement of the machine element.

6. Process as claimed in claim 5, wherein the processed signal is a portion of an originally received signal having an adjustable period which has been separated from the originally received signal.

7. Process as claimed in claim 6, wherein the adjustable period is a period which is characteristic of the damage to the moving machine element.

8. Process as claimed in claim 7, wherein the moving machine element is a roller bearing.

9. Process as claimed in claim 8, wherein a damage length is determined from the reshaped signal.

10. Process as claimed in claim 1, wherein the approximation value for each defined size class is determined by an average of the maximum and minimum discrete measured amplitude values in each defined size class.

* * * * *